(12) United States Patent
Rasmussen et al.

(10) Patent No.: US 12,203,501 B2
(45) Date of Patent: Jan. 21, 2025

(54) SELF-ALIGNING BEARING SUPPORT ASSEMBLY FOR SUPPORTING A RADIAL LOAD ROTARY OR LINEAR BEARING

(71) Applicant: Component 2.0 A/S, Hørsholm (DK)

(72) Inventors: Janus Juul Rasmussen, Helsinge (DK); Alexander Meyhoff Crone, Vedbæk (DK)

(73) Assignee: Component 2.0 A/S, Hørsholm (DK)

( * ) Notice: Subject to any disclaimer, the term of this patent is extended or adjusted under 35 U.S.C. 154(b) by 114 days.

(21) Appl. No.: 17/782,856

(22) PCT Filed: Dec. 10, 2020

(86) PCT No.: PCT/DK2020/050349
§ 371 (c)(1),
(2) Date: Jun. 6, 2022

(87) PCT Pub. No.: WO2021/121498
PCT Pub. Date: Jun. 24, 2021

(65) Prior Publication Data
US 2023/0008934 A1    Jan. 12, 2023

(30) Foreign Application Priority Data
Dec. 16, 2019   (DK) .................................. 201970774

(51) Int. Cl.
*F16C 23/04*   (2006.01)
*F16C 25/04*   (2006.01)
(Continued)

(52) U.S. Cl.
CPC .............. *F16C 23/04* (2013.01); *F16C 25/04* (2013.01); *F16C 27/063* (2013.01); *F16C 29/001* (2013.01)

(58) Field of Classification Search
CPC .......... F16C 23/04; F16C 25/04; F16C 27/02; F16C 27/063; F16C 27/066; F16C 29/001
See application file for complete search history.

(56) References Cited

U.S. PATENT DOCUMENTS 2,927,825 A    3/1960   Stone
3,890,854 A *  6/1975   Pitner .................... F16C 19/466
                                                       384/582

(Continued)

FOREIGN PATENT DOCUMENTS

GB            1401425 A  *  7/1975   .............. F16C 17/03

OTHER PUBLICATIONS

International Search Report, Application No. PCT/DK2020/050349, Mailed Feb. 1, 2021, 2 pages.

*Primary Examiner* — Alan B Waits
(74) *Attorney, Agent, or Firm* — Nordic Patent Service

(57) ABSTRACT

A self-aligning bearing support assembly for supporting a radial load rotary or linear bearing. The bearing support assembly has a main axis (A) and includes an outer sleeve and an inner sleeve at least partially received in the outer sleeve. The inner sleeve has an axially extending bore for supporting a rotary or linear bearing or for forming a bearing surface of a bearing. Three or more circumferentially separated chambers are formed between the inner sleeve and the outer sleeve. Each chamber is confined in all directions by walls of the assembly. A lump of a substantially incompressible material fills each of the at least three chambers with the chamber concerned substantially completely enclosing the lump.

15 Claims, 4 Drawing Sheets

(51) Int. Cl.
    *F16C 27/06*    (2006.01)
    *F16C 29/00*    (2006.01)

(56) References Cited

U.S. PATENT DOCUMENTS

| | | | | |
|---|---|---|---|---|
| 4,639,150 A * | 1/1987 | Habermann | .......... | F16C 27/066 |
| | | | | 384/582 |
| 5,078,510 A * | 1/1992 | Bair | ............... | F16C 27/066 |
| | | | | 384/582 |
| 7,637,666 B2 * | 12/2009 | Schmid | ............ | F16C 27/063 |
| | | | | 384/582 |
| 2007/0211980 A1 * | 9/2007 | Schmid | ............ | F16C 27/063 |
| | | | | 384/536 |

* cited by examiner

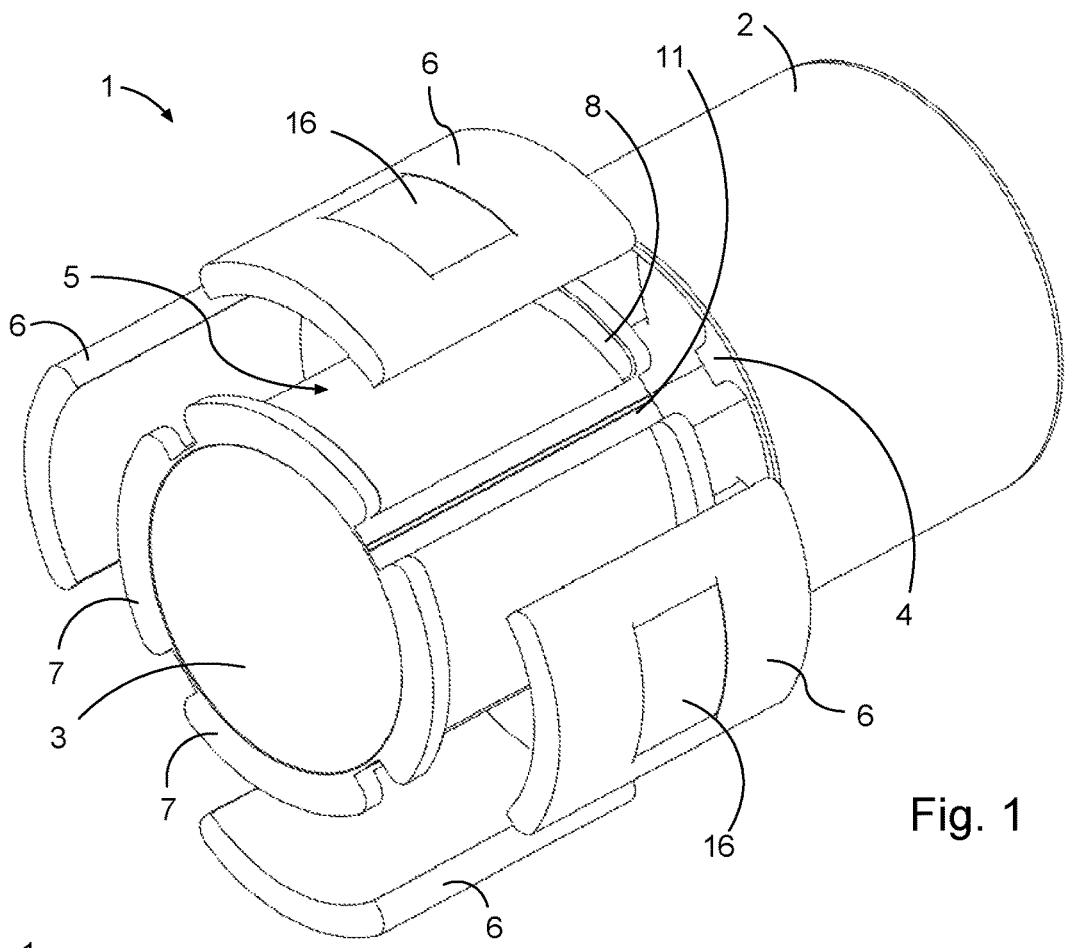
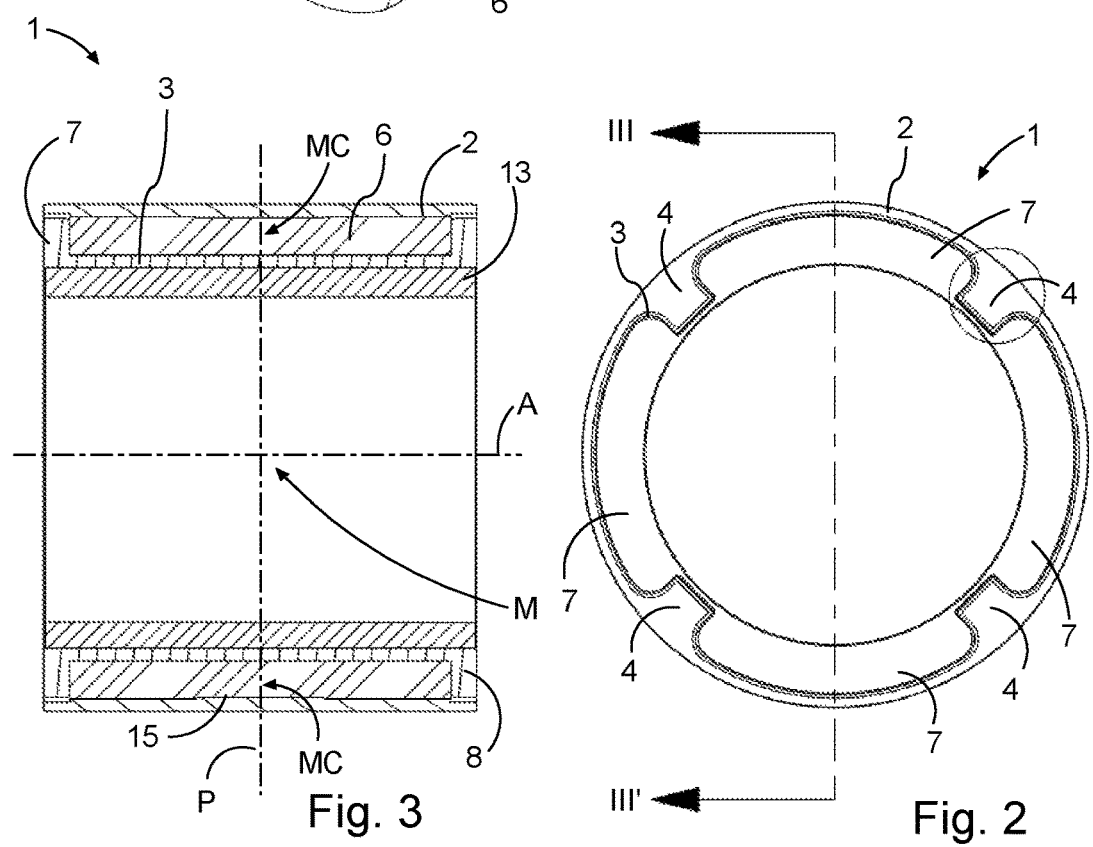
Fig. 1
Fig. 3
Fig. 2

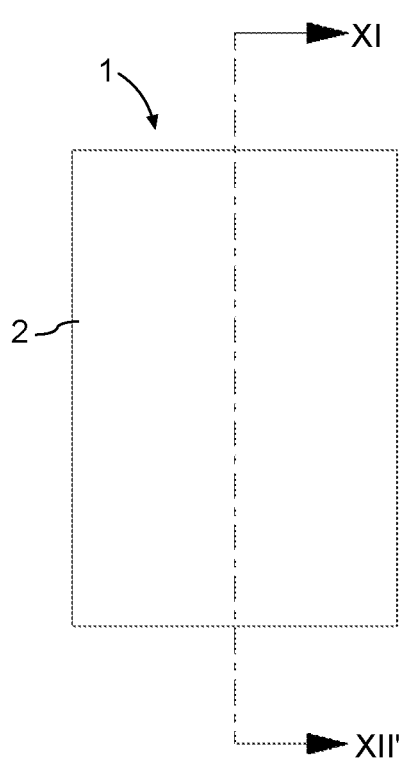
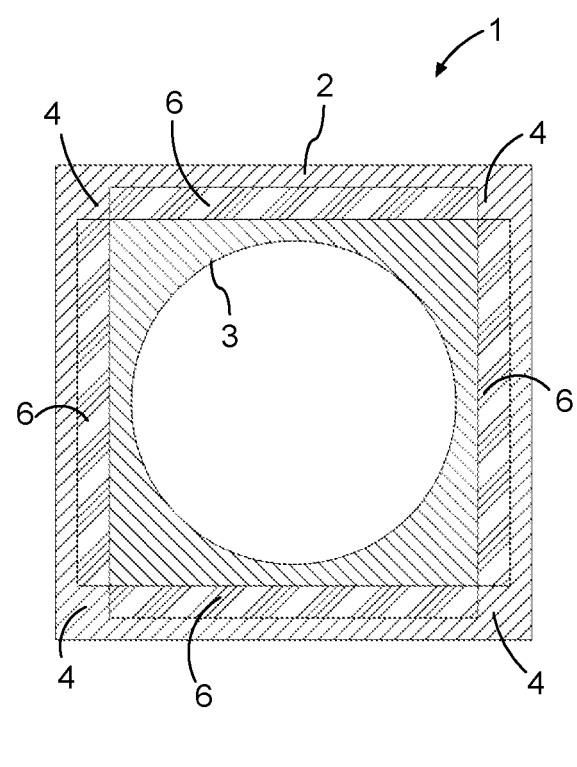
Fig. 10        Fig. 11
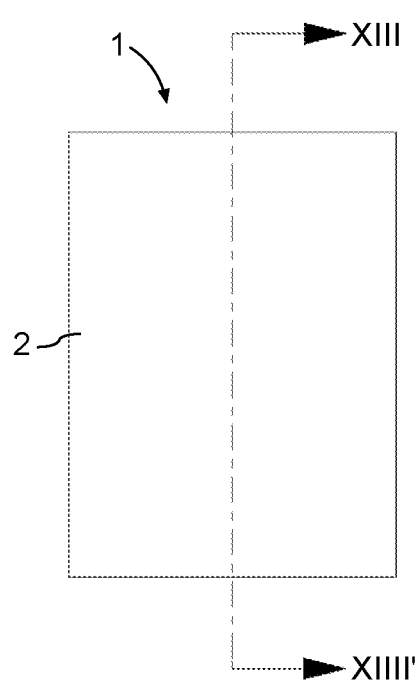
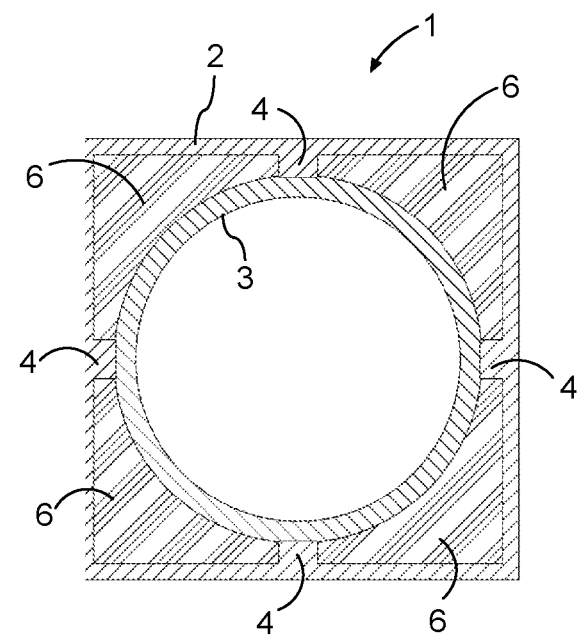
Fig. 12        Fig. 13

SELF-ALIGNING BEARING SUPPORT ASSEMBLY FOR SUPPORTING A RADIAL LOAD ROTARY OR LINEAR BEARING

TECHNICAL FIELD

The disclosure relates to a self-aligning support assembly for bearings for rotary or sliding movement, especially for radial load only, more especially for self-aligning sliding-contact radial load bearings for rotary or sliding movement. The disclosure also relates to self-aligning for bearings for rotary movement, especially for radial load only, more especially for self-aligning sliding-contact radial load bearings for rotary movement.

BACKGROUND

Sliding-contact radial load bearings, also referred to as plain radial bearings, require a substantial axial extent (width) for obtaining a high radial load capacity. However, the large axial extent makes it virtually impossible for these bearings to accommodate misalignment. Typically, a shaft is supported by two axially spaced radial load bearings that are supported by a housing, frame, or other support structure. It is very cost-intensive to produce a perfectly aligned support for such bearings. Further, wear, external loads and temperature changes are likely to negatively affect the alignment. Thus, even if the alignment from factory was nearly perfect, misalignment will often occur during use.

Thus, there is a need for a bearing support that accommodates misalignment. Such a bearing support should be radially stiff (stiff in the direction of the load) and it should be compact, i.e. it should not take up much space.

Spherical plain bearings, such as disclosed in EP2012719855, permit angular rotation about a central point in two orthogonal directions, thus allowing for self-aligning, and avoid bending moments on the bearing due to misalignment. This bearing supports a rotating or sliding shaft in the bore of the inner ring that must move not only rotationally, but also at an angle. A drawback of this type of bearing is that the outer diameter of the bearing increases with the axial extent of the bearing and bearings for heavy loads need a large axial extent which will result in a large outer diameter, rendering the bearing voluminous and not compact.

US20070211980 discloses a self-aligning bearing support assembly for supporting a radial load rotary or linear bearing, comprising an outer sleeve and an inner sleeve at least partially disposed in the outer sleeve, the inner sleeve having an axially extending bore for supporting a rotary or linear bearing or for forming a bearing surface of a radial load rotary or linear bearing, three or more circumferentially separated chambers formed between the inner sleeve and the outer sleeve, each chamber being confined in all directions by walls of the assembly.

SUMMARY

It is an object to provide a support assembly and bearing that overcome or at least reduce the problems mentioned above. The foregoing and other objects are achieved by the features of the independent claims. Further implementation forms are apparent from the dependent claims, the description, and the figures.

According to a first aspect, there is provided a self-aligning bearing support assembly for supporting a radial load rotary or linear bearing, the bearing support assembly has a main axis A and comprises: an outer sleeve and an inner sleeve at least partially disposed in the outer sleeve, the inner sleeve having an axially extending bore for supporting a rotary or linear bearing or for forming a bearing surface of a radial load rotary or linear bearing, three or more circumferentially separated chambers formed between the inner sleeve and the outer sleeve, each chamber being confined in all directions by walls of the assembly, a lump of a substantially incompressible material filling each of the at least three chambers, with the chamber concerned substantially completely enclosing the lump.

The inventor arrived at the insight that it would be possible to provide a radially stiff support that provides low resistance to angular rotation by exploiting the characteristic of most (viscous) fluids of incompressibility and virtual absence of resistance to slow deformation. However, such a bearing support would require hermetically sealed chambers filled with a suitable liquid. Suitable liquids are plentiful. However, sealing the chambers hermetically is a significant technical challenge.

The inventor arrived at the further insight that materials such as e.g. natural rubber, synthetic rubber, and other elastomers behave like a liquid in that they are substantially incompressible and provide little resistance to deformation, and at the insight that a chamber filled with such material would not need to be hermetically sealed to obtain the desired effect.

By providing a plurality of chambers filled with a lump of substantially incompressible solid material that essentially behaves like a liquid it is possible to provide a bearing support that is stiff in the radial direction i.e. the load direction whilst it is flexible for accommodating axial misalignments since the inner sleeve is allowed angular rotation about a central point in two orthogonal directions relative to the outer sleeve, thereby avoiding bending moments on the bearing. The lump is restrained in the chamber, thereby rendering the bearing radially stiff. Radial displacement of the inner sleeve relative to the outer sleeve would require compression of at least one of the lumps, which is not possible since the lump is entrapped in the chamber.

The bearing support can form a bearing with the inner surface of the inner sleeve forming a bearing surface or the bearing support can a bushing for supporting a bearing that is supported by the inner surface of the inner sleeve.

In a possible implementation form of the first aspect, the lump is restrained in all directions by the chamber.

In a possible implementation form of the first aspect, the chamber prevents expansion of the pad in all directions.

In a possible implementation form of the first aspect rotation about a midpoint of the bearing assembly changes the shape of the chambers without changing the volume of the chambers, thereby deforming the lumps concerned in the chambers without changing the volume of the lumps concerned in the chambers.

In a possible implementation form of the first aspect, an axial midpoint of each of the chambers is axially aligned with the axial midpoint MC of the other chambers.

In a possible implementation form of the first aspect, the assembly is configured for allowing rotation of the inner sleeve relative to the outer sleeve about a radial axis R contained in a radial plane that intersects with the main axis A at an axial midpoint M of the assembly, the (axial) midpoint M of the assembly preferably being aligned with the axial midpoint (MC) of the chambers.

In a possible implementation form of the first aspect, the lump is formed of a polymer or an elastomer, preferably natural or synthetic rubber or a mixture thereof.

In a possible implementation form of the first aspect, the lump is formed of a material with a Poisson's ratio of approximately 0.5.

In a possible implementation form of the first aspect, the lump is a pad, preferably a curved pad.

In a possible implementation form of the first aspect, the assembly comprises axially extending separators between two circumferentially neighboring chambers for circumferentially dividing a space between the inner sleeve and the outer sleeve into at least three circumferentially separated chambers. Thus, expansion of the lump in a circumferential direction is prevented.

In a possible implementation form of the first aspect the separators extend along the complete axial extent of the chambers and wherein the separators have a radial extent that at least almost covers the radial extent of the chambers.

In a possible implementation form of the first aspect, the separators have two oppositely directed circumferentially facing surfaces that each form a side of a neighboring chamber.

In a possible implementation form of the first aspect, a separator is an integral part of the outer sleeve or an integral part of the inner sleeve.

In a possible implementation form of the first aspect, a separator is partially received in an axially extending groove in the outer sleeve and/or in an axially extending groove in the inner sleeve.

In a possible implementation form of the first aspect, the separators form the circumferential boundaries of the chambers.

In a possible implementation form of the first aspect, the outer sleeve and/or the inner sleeve are provided with a preferably circumferentially noncontinuous first flange and/or second flange, the first flange preferably being axially spaced from the second flange by the axial extent of the chambers, and the first flange and/or the second flange preferably having a radial extent that is slightly less than the radial extent of the chambers.

In a possible implementation form of the first aspect, the first flange and the second flange form the axial boundaries of the chambers and prevent axial expansion of the lumps.

In a possible implementation form of the first aspect, the chambers are symmetrically arranged around the main axis A and around the midpoint M of the assembly. This aids in assuring that the bearing support behaves uniformly in response to loads.

In a possible implementation form of the first aspect, the lumps all have identical shape, size, and material properties. This aids in assuring that the bearing support behaves uniformly in response to loads.

In a possible implementation form of the first aspect. the number of chambers is a multiple of four. This aids in assuring that the bearing support behaves uniformly in response to loads.

In a possible implementation form of the first aspect. the chambers and the lumps are substantially arch-shaped. This aids in rendering the bearing support compact.

In a possible implementation form of the first aspect. the substantially incompressible material of the lumps is isotropic. This aids in rendering the characteristics of the bearing support uniform with respect to response to any type of load.

In a possible implementation form of the first aspect, the lump is formed of a substantially incompressible isotropic material, which when deformed elastically at small strains has a Poisson's ratio of approximately 0,5.

In a possible implementation form of the first aspect, the center of inertia of the lumps is located in the midpoint of the bearing support assembly. This aids in assuring that the bearing support behaves uniformly in response to loads.

In a possible implementation form of the first aspect, the midpoint of the bearing assembly is axially and radially medially located in the bearing assembly. This aids in assuring that the bearing support behaves uniformly in response to loads.

According to a second aspect, there is provided a self-aligning support assembly or bushing, the support assembly or bushing has a main axis A and comprises:

an outer sleeve and an inner sleeve at least partially disposed in the outer sleeve, the inner sleeve having an axially extending bore for supporting an object to be supported, three or more circumferentially separated chambers formed between the inner sleeve and the outer sleeve, each chamber being confined in all directions by walls of the assembly, a lump of a substantially incompressible material filling each of the at least three chambers, with the chamber concerned substantially completely enclosing the lump.

These and other aspects will be apparent from and the embodiment(s) described below.

BRIEF DESCRIPTION OF THE DRAWINGS

In the following detailed portion of the present disclosure, the aspects, embodiments, and implementations will be explained in more detail with reference to the example embodiments shown in the drawings, in which:

FIG. 1 is an elevated exploded view of a bearing support assembly according to an embodiment, FIG. 2 is an end view of the bearing support assembly of FIG. 1.

FIG. 3 is a sectional view of the bearing support assembly of FIG. 1 along the plane III-III' of FIG. 2.

FIGS. 10 and 11 are a side and cross-sectional view, respectively of another embodiment of the bearing support, and FIGS. 12 and 13 are a side and cross-sectional view of yet another embodiment of the bearing support.

DETAILED DESCRIPTION

Figure 4:
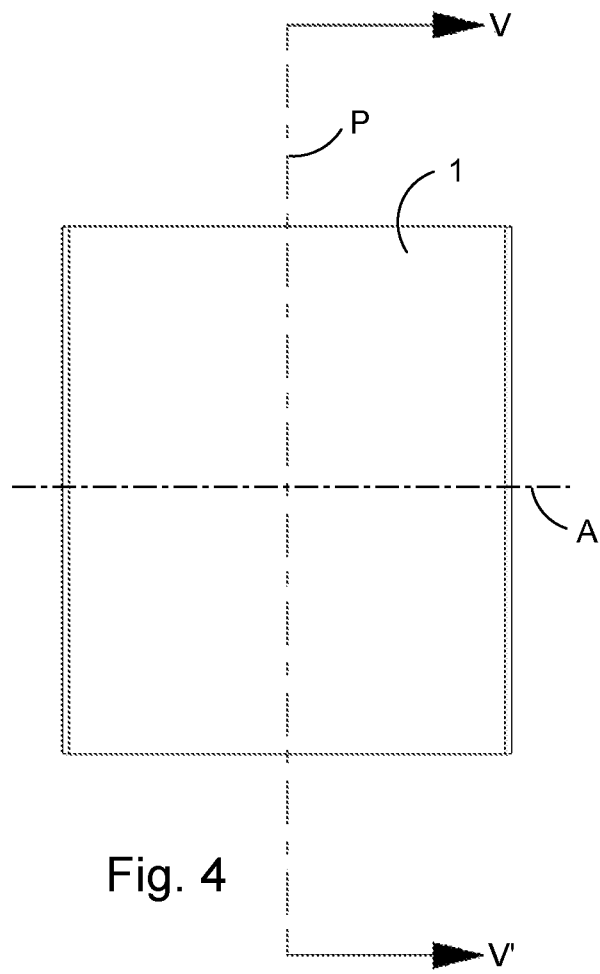
FIG. 4 is a side view of the bearing support assembly of FIG. 1.
Figure 5:
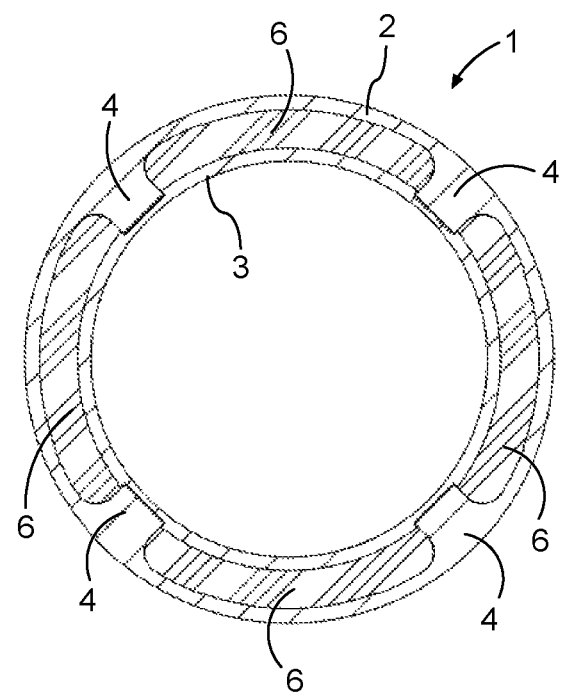
FIG. 5 is a cross-sectional view of the bearing support assembly of FIG. 1 along the plane V-V' of FIG. 4, FIGS. 6 and 7 are enlarged details of alternative embodiments.

FIGS. 1 to 9 illustrate an embodiment of a self-aligning bearing support assembly 1. The self-aligning bearing support assembly 1 is particularly suitable for supporting radial loads. The self-aligning bearing support assembly 1 is suitable for supporting a rotary or linear movement bearing. The self-aligning bearing support assembly 1 is either separate from the supported bearing or an integral part of the supported bearing. The self-aligning bearing support 1 is suitable to support e.g. a plain bearing (sliding contact bearing), a hydrodynamic bearing, or a roller bearing (for example a deep-groove ball bearing, angular contact ball bearing, a self-aligning ball bearing, a spherical roller bearing, a cylindrical roller bearing, a tapered roller bearing, or a needle roller bearing).

The self-aligning bearing support assembly has a main axis A and comprises an outer sleeve 2 and an inner sleeve 3. The outer sleeve 2 has an axially extending hollow (extending along the main axis A). The inner sleeve 3 has an axially extending bore extending along the main axis A for supporting a rotary or linear bearing or for forming a bearing surface of a rotary or linear bearing. The inner sleeve 3 is at least partially disposed inside the hollow in the outer sleeve 2. Generally, there is a space between the outer side of the inner sleeve 3 and the inner side of the outer sleeve 2. This space is circumferentially divided into four circumferentially separated chambers that are arranged between the inner sleeve 3 and the outer sleeve 2. However, it should be understood that the space between the outside of the inner sleeve 3 and the inside of the outer sleeve 2 can be divided into as few as three chambers and can be divided into more than four chambers. Preferably, the number of chambers is four or a multiple of four. Each chamber is confined in all directions by walls of the assembly 1, as will be described in greater detail further below.

The radially inwardly facing wall of a chamber is formed by the inner sleeve 3 and the radially outwardly facing wall of a chamber is formed by the outer sleeve 2. The axially facing walls of a chamber are formed by a (preferably circumferentially non-continuous) first flange 7 and second flange 8. Thus, the chamber is located between two axially facing walls formed by the first and second flange 7,8. Each chamber is circumferentially located between two axially extending separators 4 that form circumferentially facing walls of a chamber.

In the present embodiment, the first flange 7 and the second flange 8 are part of the inner sleeve 3. However, it should be understood that the first flange 7 and the second flange may just as well be part of the outer sleeve 2. Alternatively, a portion of the first flange 7 is part of the inner sleeve 3 and another portion of the first flange 7 is part of the outer sleeve 2. Likewise, in an alternative embodiment, a portion of the second flange 8 is part of the inner sleeve 3 and another portion of the second flange 8 is part of the outer sleeve 2.

The first flange 7 is axially spaced from the second flange 8 by the axial extent of the chambers. The first flange 7 and the second flange 8 have a radial extent that is slightly less than the radial extent of the chambers, so that there is a clearance between the first and second flange 7,8 and the inwardly facing surface of the outer sleeve 2 to allow angular rotation about the midpoint M of the self-aligning bearing assembly 1 without the first and second flange 7,8 touching the inner surface of the outer sleeve 2.

FIG. 3 shows an optional bushing 13, but it is understood that the bearing support 1 can function without the optional bushing 13. The inner surface of the inner sleeve 3 can act as the bearing surface for a plain bearing (sliding contact bearing) or the inner surface of the sleeve can support a bearing of any suitable type.

In the present embodiment, both the first and second flange 7, 8 are interrupted by four recesses (one for each separator 4) that have a size and shape that allows separators 4 to pass through the recesses with a clearance between the recess and the separator 4. This facilitates the assembly of the inner sleeve 3 into the outer sleeve 2. Since the separators 4 have an axial extent that is slightly longer than the axial extent of the chambers and substantially equal to the total axial length of the inner sleeve 3, the separators 4 are received in the recesses in the first and second flange 7,8 when the bearing support 1 is assembled. Thus, rotational displacement of the inner sleeve 3 relative to the outer sleeve 2 is restricted to the amount of clearance between the recesses and the separators 4. Preferably, the transition of the edge of the first or second flange 7,8 into the recess is curved, to facilitate rotation of the inner sleeve 3 relative to the outer sleeve 2.

In an embodiment, the inner surface of the outer sleeve 2 is provided with a slight protrusion 15 that is received in a slide shallow recess 16 in the lump 6 that is received in the chamber concerned. The engagement between the slight protrusion 15 and shallow recess 16 locks the lumps 6 axially and circumferentially to the outer sleeve 2.

Each chamber is circumferentially located between two axially extending separators 4, and each chamber is thus delimited at two sides by a substantially circumferentially facing wall of a separator 4. The circumferentially facing walls extend at least nearly the full radial extent of a chamber.

In the embodiment of FIG. 1, the separators 4 are part of the outer sleeve 2 and are partially received in an axially extending groove 11 in the inner sleeve 3.

The axially extending separators 4 between two circumferentially neighboring chambers circumferentially divide a space between the inner sleeve 3 and the outer sleeve 2 into four circumferentially separated chambers.

The separators 4 extend along the complete axial extent of the chambers and the separators 4 have a radial extent that is at least almost covers the radial extent of the chambers.

The separators 4 have two oppositely directed circumferentially facing surfaces that each form a side of a neighboring chamber. The separators 4 form the circumferential boundaries of the chambers.

In an embodiment, the separator 4 is partially received in an axially extending groove 11. This allows the separator 4 to extend the full radial extent of the chamber. The axially extending groove 11 is deep enough to allow some movement of the inner sleeve 3 relative to the outer sleeve 2 so that angular rotation of the inner sleeve 3 relative to the outer sleeve 2 about the midpoint M can take place without the separator 4 abutting the bottom of the axially extending groove 11.

Figure 6:
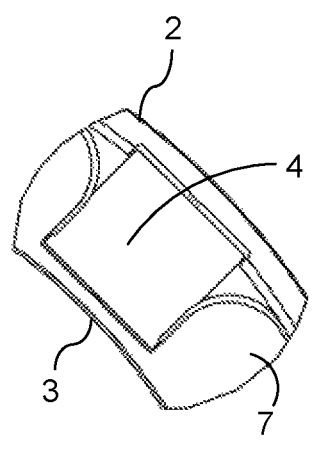

In a variation of the present embodiment, shown in FIG. 6, the separator 4 is neither a part of the outer sleeve 2 nor of the inner sleeve 2. Instead, there is an axial groove in both the inner and the outer sleeve 2,3 for partially receiving the separator 4 concerned.

Figure 7:
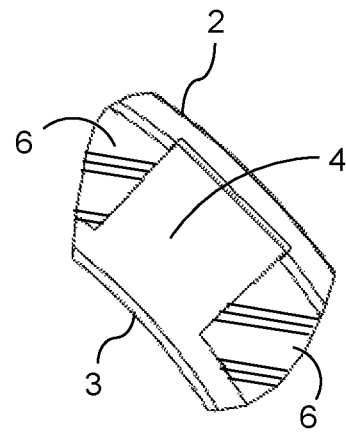

In a variation of the present embodiment, shown in FIG. 7, the separator 4 is a part of the inner sleeve 3. In this embodiment, the separator 4 is preferably partially received in an axial groove in the inner surface of the outer sleeve 2.

In an embodiment, one separator 4 can be an integral part of the outer sleeve 2 and another separator 4 can be an integral part of the inner sleeve 3. This arrangement can also be combined with a separator 4 that is neither part of the inner sleeve 3 nor of the outer sleeve 2.

A lump 6 of a substantially incompressible material fills each of the chambers. The lump 6 preferably has, when not deformed, a shape and size that corresponds to the shape and size of the chamber concerned when the inner sleeve 3 is aligned with the outer sleeve 3, i.e. when the main axis A of the inner and outer sleeve coincide.

The chamber concerned substantially completely encloses the lump 6, i.e. the lump 6 is entrapped in the chamber and is prevented from deforming in a way that brings any part of the lump 6 outside of the chamber. Thus, the lump 6 is restrained in all directions, so that it cannot expand. This results in a very high radial stiffness of the bearing support 1.

Since the lump 6 is formed by a solid, there is no need for the chamber to be hermetically sealed, i.e. it is acceptable if fluids can enter and escape from the chamber as long as no part of the lump 6 can escape from the chamber.

The lump 6 is elastically deformable but substantially incompressible. Since the incompressible lump 6 completely fills the chamber, the lump 6 prevents change of volume of the chamber, but the lump 6 does not prevent any deformation of the chamber that does not reduce the volume of the chamber.

Only a minor force is required to elastically deform the lump 6 for deforming the chamber without decreasing the volume of the chamber. Thus, angular adjustment requires little bending moment, thereby avoiding bending moment on the bearing that is supported or that is an integral part of the bearing support assembly 1. Thus, even if there is misalignment, there will be only a very small bending moment on the bearing thus ensuring a long life expectancy for the bearing.

Figures 8, 9:
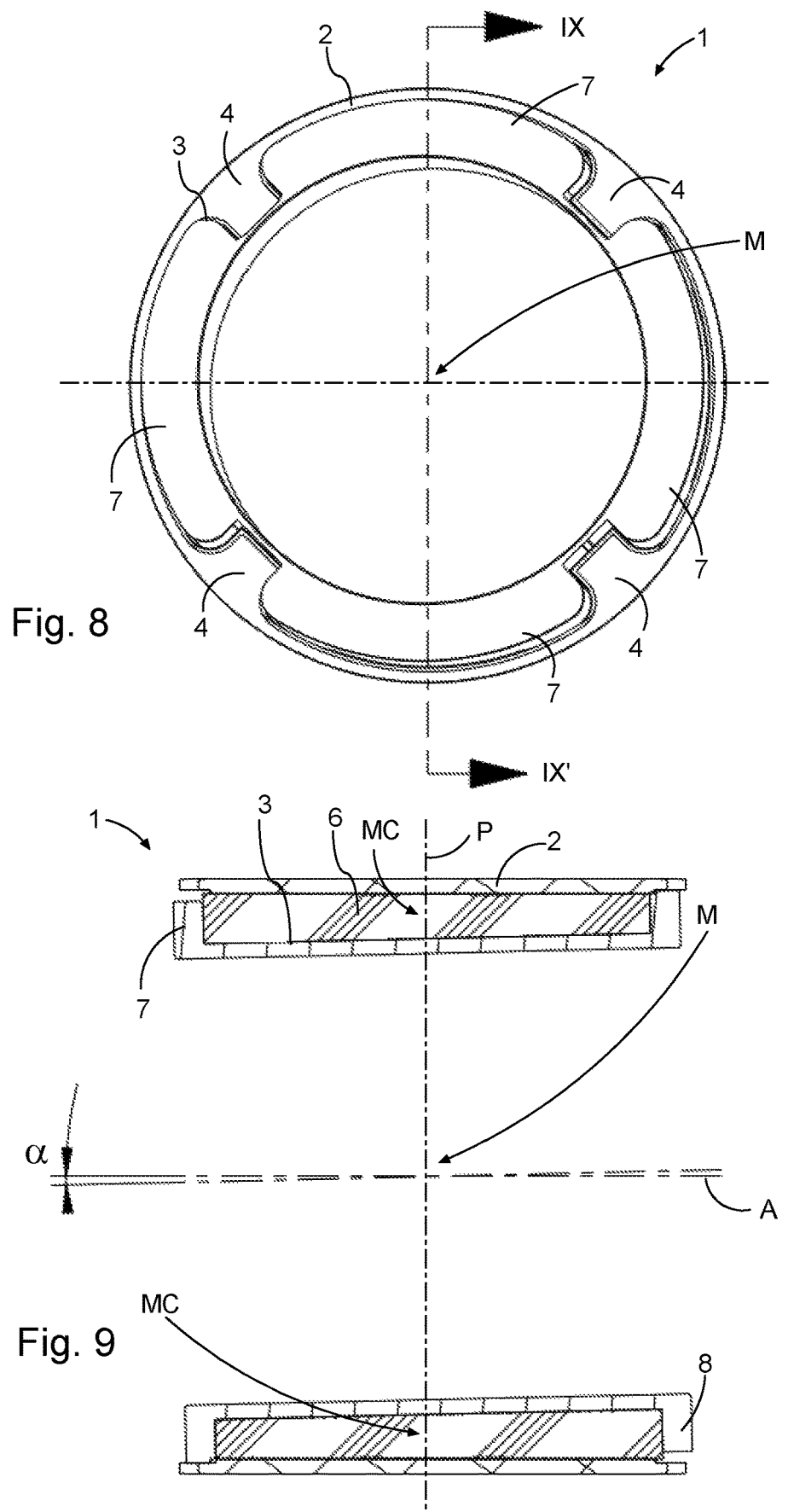
FIG. 8 is an end view of the bearing support assembly of FIG. 1, illustrating angular rotation of an inner sleeve relative to an outer sleeve of the bearing assembly.
FIG. 9 is a sectional view of the bearing support assembly of FIG. 8 along the plane IX-IX' of FIG. 8 illustrating the angular rotation of the inner sleeve relative to the outer sleeve of the bearing assembly.

When the inner sleeve 3 angularly rotates as shown in FIGS. 8 and 9 about the midpoint M over an angle α, the lumps 6 deform, but the volume of the lumps 6 remains unchanged. Thus, angular rotation about the midpoint M requires little force (bending moment) since it requires only deformation of the lumps 6 and does not require compression of the lumps 6. During angular movement about the midpoint M material of the lump 6 moves from one side to the other side of the lump 6, as if the material of the lump 6 was a viscous fluid. The lump 6 is made of a material that requires little force to deform. This allows the support assembly 1 to adjust to misalignment of the bearing without applying any significant bending moment to the bearing.

Thus, the inner sleeve 3 is allowed angular rotation about the midpoint in two orthogonal directions relative to the outer sleeve 2, thereby deforming the lumps 6.

The angular rotation shown in FIGS. 8 and 9 is well over 1°, which is more than typically needs to be handled by the bearing support 1. However, this exaggerated angle is shown in the FIGS. for illustration purposes. In real applications, the angle of rotation would normally be no more than approximately 0,2°. However, such a small angle of rotation would be practically impossible to see in the drawings.

General displacement in a radial direction of the inner sleeve 3 relative to the outer sleeve 2 requires a reduction in volume of at least one of the chambers, i.e. compression of the lump 6 in the chamber, and thus is prevented by the incompressibility of the lump 6 in the chamber or chambers concerned. Thus, the bearing support 1 is relatively stiff in response to radial loads since a general radial displacement of the inner sleeve 3 relative to the outer sleeve 2 requires compression of one or more of the lumps 6, which these lumps 6 resist since they are essentially incompressible.

The bearing assembly 1 allows angular rotation of the inner sleeve 3 relative to the outer sleeve 2 about a radial axis R contained in a radial plane P that intersects with the main axis A at the axial midpoint M of the bearing assembly 1, the axial midpoint M of the assembly preferably being (axially) aligned with to an axial midpoint MC of the chambers.

Preferably, the bearing support assembly is designed completely systemically around the midpoint M of the bearing assembly 1, so that the bearing support is equally stiff in all linear ad rotational directions. In an embodiment, the inertia of the bearing assembly coincides with the midpoint M.

Thus, the chambers and lumps 6 preferably all have an identical shape, size, and material properties, and the chambers are symmetrically arranged around the main axis A and symmetrically around the midpoint M of the bearing support assembly 1.

The midpoint M is located on the main axis A and preferably arranged in the middle of the axial extent of the bearing support.

In the present embodiment, the lumps 6 are arch-shaped pads 6 with correspondingly shaped chambers.

The lumps (pads) 6 may be made from a homogeneous material or from a nonhomogeneous material. In an embodiment, the lumps 6 all have identical shape, size, and material properties.

In an embodiment, the lumps (pads) 6 are layered in order to obtain desired characteristics.

Materials that are suitable for use in the lumps 6 are materials that display rubber-like elasticity and that are substantially incompressible, i.e. have a compressibility similar to that of natural rubber, or that are even less compressible.

Rubber-like solids with elastic properties are typically referred to as elastomers. Natural rubber, neoprene rubber, buna-s, and buna-n are all examples of such elastomers. An elastomer has weak intermolecular forces, generally low Young's modulus and high failure strain compared with other materials.

Following is a non-exhaustive list of suitable elastomeric materials for use in the pads 6:

Natural polyisoprene: cis-1,4-polyisoprene natural rubber (NR) and trans-1,4-polyisoprene gutta-percha, Synthetic polyisoprene (IR for isoprene rubber), Polybutadiene (BR for butadiene rubber), Chloroprene rubber (CR), polychloroprene, Neoprene, Baypren etc., Butyl rubber (copolymer of isobutylene and isoprene, IIR), Halogenated butyl rubbers (chloro butyl rubber: CIIR; bromo butyl rubber: BIIR), Styrene-butadiene ubber (copolymer of styrene and butadiene, SBR), Nitrile rubber (copolymer of butadiene and acrylonitrile, NBR), also called Buna N rubbers, Hydrogenated Nitrile Rubbers (HNBR) Therban and Zetpol, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR),Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA).

Teflon (PTFE) and PTFE Polymer are also suitable materials for use in the lumps 6. Suitable materials for the lump 6 preferably have a Poisson's ratio of approximately 0.5. The lumps 6 can be a hybrid of the above listed and/or other suitable materials.

Incompressible elastomers generally have a positive coefficient of thermal expansion. In an embodiment, one or more layers of material with a negative coefficient of thermal expansion are included in the pad or used in the walls surrounding a chamber to at least partially compensate for the thermal expansion of the incompressible elastomers in the lump 6. Examples of materials with a negative thermal coefficient of expansion are e.g. zirconium tungstate. The resulting thermal coefficient of expansion of the lump 6 or the lump/chamber combination is preferably substantially equal to the thermal expansion coefficient of the inner sleeve 3 and the outer sleeve 2 so that temperature changes have minimal impact on the behavior of the bearing support 1.

FIGS. 10 and 11 show another embodiment of the bearing support 1. In this embodiment, structures and features that are the same or similar to corresponding structures and features previously described or shown herein are denoted by the same reference numeral as previously used for simplicity. The bearing support 1 according to this embodiment is constructed according to the same principles as the bearing support 1 described with reference to FIGS. 1 to 9. However, the outer sleeve 2 has a squared cross-sectional outline and the lumps 6 are flat pads 6 as opposed to curved pads 6. Accordingly, the inner sleeve 3 has a rectilinear cross-sectional outline and a cylindrical bore. The separators 4 are shown as an integral part of the outer sleeve 2, but the separators 4 could just as well have been separate from the inner sleeve 3 and the outer sleeve 2.

The inner sleeve 3 and/or the outer sleeve 2 will be provided with a first and second flange to prevent and restrain axial expansion of the lumps 6.

FIGS. 12 and 13 show another embodiment of the bearing support 1. In this embodiment, structures and features that are the same or similar to corresponding structures and features previously described or shown herein are denoted by the same reference numeral as previously used for simplicity. The bearing support 1 according to this embodiment is constructed according to the same principles as the bearing support 1 described with reference to FIGS. 1 to 9. However, the outer sleeve 2 has a squared cross-sectional outline and the lumps 6 have a rectangular cross-section as opposed to the curved pads 6 of FIGS. 1 to 9. Accordingly, the inner sleeve 3 has an annular cross-sectional shape. The separators 4 are shown as an integral part of the outer sleeve 2, but the separators 4 could just as well have been separate from the inner sleeve 3 and the outer sleeve 2 or be an integral part of the inner sleeve 3. The inner sleeve 3 and/or the outer sleeve 2 will be provided with a first and second flange to prevent and restrain axial expansion of the lumps 6.

According to an embodiment, the support assembly supports an object that is not a bearing, such as e.g. a bolt, and forms e.g. a bushing.

The various aspects and implementations have been described in conjunction with various embodiments herein. However, other variations to the disclosed embodiments can be understood and effected by those skilled in the art of practicing the claimed subject-matter, from a study of the drawings, the disclosure, and the appended claims. In the claims, the word "comprising" does not exclude other elements or steps, and the indefinite article "a" or "an" does not exclude a plurality.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "inwardly" and "outwardly" generally refer to the orientation of a surface relative to its axis of elongation, or axis of rotation, as appropriate.

The invention claimed is:

1. A self-aligning bearing support assembly for supporting a radial load rotary or linear bearing, said bearing support assembly has a main axis (A) and comprises:
   an outer sleeve and an inner sleeve at least partially disposed in said outer sleeve,
   said inner sleeve having an axially extending bore for supporting a rotary or linear bearing or for forming a bearing surface of a radial load rotary or linear bearing,
   at least three circumferentially separated chambers formed by said inner sleeve and said outer sleeve,
   axially extending separators between two circumferentially neighboring chambers circumferentially dividing a space between said inner sleeve and said outer sleeve into said at least three circumferentially separated chambers,
   each chamber being confined in all directions by walls of said assembly,
   a lump of an elastically deformable and substantially incompressible material filling each of said at least three chambers,
   with the chamber concerned substantially completely enclosing said lump such that expansion of the lump is prevented in all directions,
   said incompressibility of said lump preventing radial displacement of said inner sleeve relative to said outer sleeve, and
   said elastic deformability of said lump allowing angular rotation of said inner sleeve about an assembly midpoint in two orthogonal directions relative to the outer sleeve, thereby deforming said lump without compressing said lump to reduce bending moment due to axial misalignment.

2. The assembly according to claim 1, configured for allowing angular rotation of the inner sleeve relative to the outer sleeve about a radial axis (R) contained in a radial plane (P) that intersects with said main axis (A) at an axial midpoint (M) of said assembly, the axial midpoint (M) of said assembly being aligned with an axial midpoint (MC) of said chambers.

3. The assembly according to claim 1, wherein said lump is formed of a polymer or an elastomer or a mixture thereof.

4. The assembly, according to claim 1, wherein said lump forms a pad.

5. The assembly, according to claim 1, wherein said separators extend along the complete axial extent of said chambers and wherein said separators have a radial extent that covers the radial extent of said chambers.

6. The assembly, according to claim 1, wherein said separators have two oppositely directed circumferentially facing surfaces that each form a side of the neighboring chambers.

7. The assembly, according to claim 1, wherein each separator is an integral part of said outer sleeve or an integral part of said inner sleeve.

8. The assembly, according to claim 1, wherein each separator is partially received in an axially extending groove in said outer sleeve or in an axially extending groove in said inner sleeve.

9. The assembly, according to claim 1, wherein said separators form the circumferential boundaries of said chambers.

10. The assembly, according to claim 1, wherein said outer sleeve and/or said inner sleeve is provided with a first flange and/or second flange, said first flange being axially spaced from said second flange by the axial extent of said chambers, and said first flange and/or said second flange has a radial extent that is less than the radial extent of said chambers.

11. The assembly, according to claim 10, wherein said first flange and said second flange form the axial boundaries of said chambers.

12. The assembly according to claim 1, wherein said chambers are symmetrically arranged around said main axis (A) and around an axial midpoint (M) of said assembly.

13. The assembly according to claim 1, wherein said lumps all have an identical shape, size, and material properties.

14. The assembly according to claim 1, wherein the number of chambers is a multiple of four.

15. The assembly according to claim 1, wherein said chambers and said lumps are substantially arch-shaped.

* * * * *